Oct. 2, 1928.  
F. W. BRIGGS  
1,686,068  
RIM REMOVING DEVICE  
Filed May 18, 1925  3 Sheets-Sheet 1

Oct. 2, 1928.
F. W. BRIGGS
1,686,068
RIM REMOVING DEVICE
Filed May 18, 1925    3 Sheets-Sheet 2
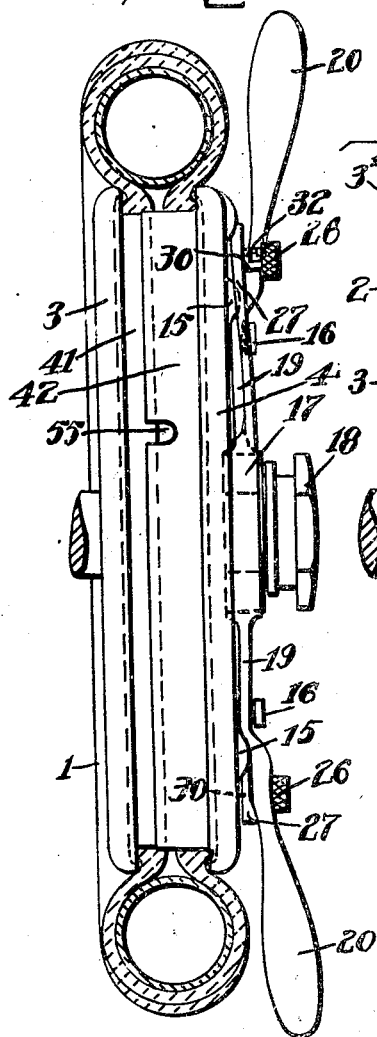
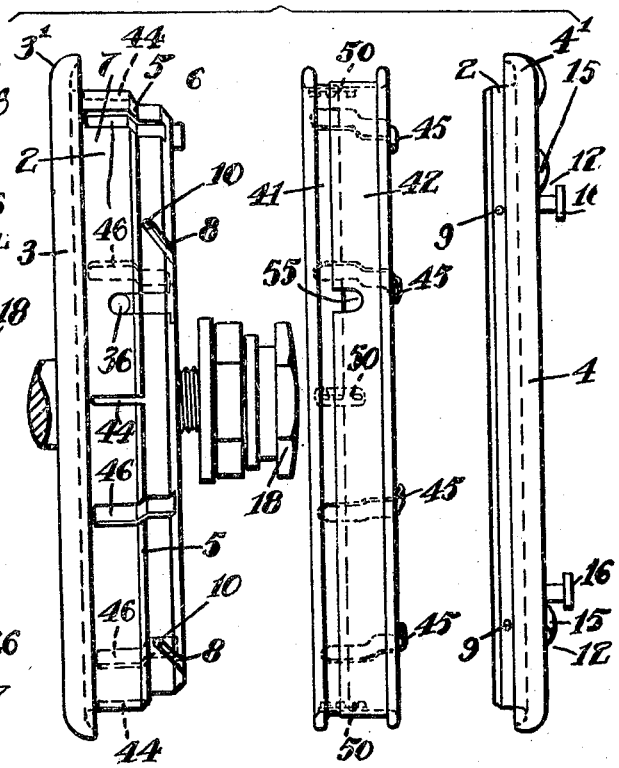
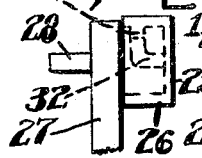
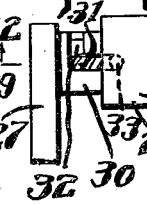
Inventor
Francis W. Briggs
By Ellis Spear Jr.
Attorney

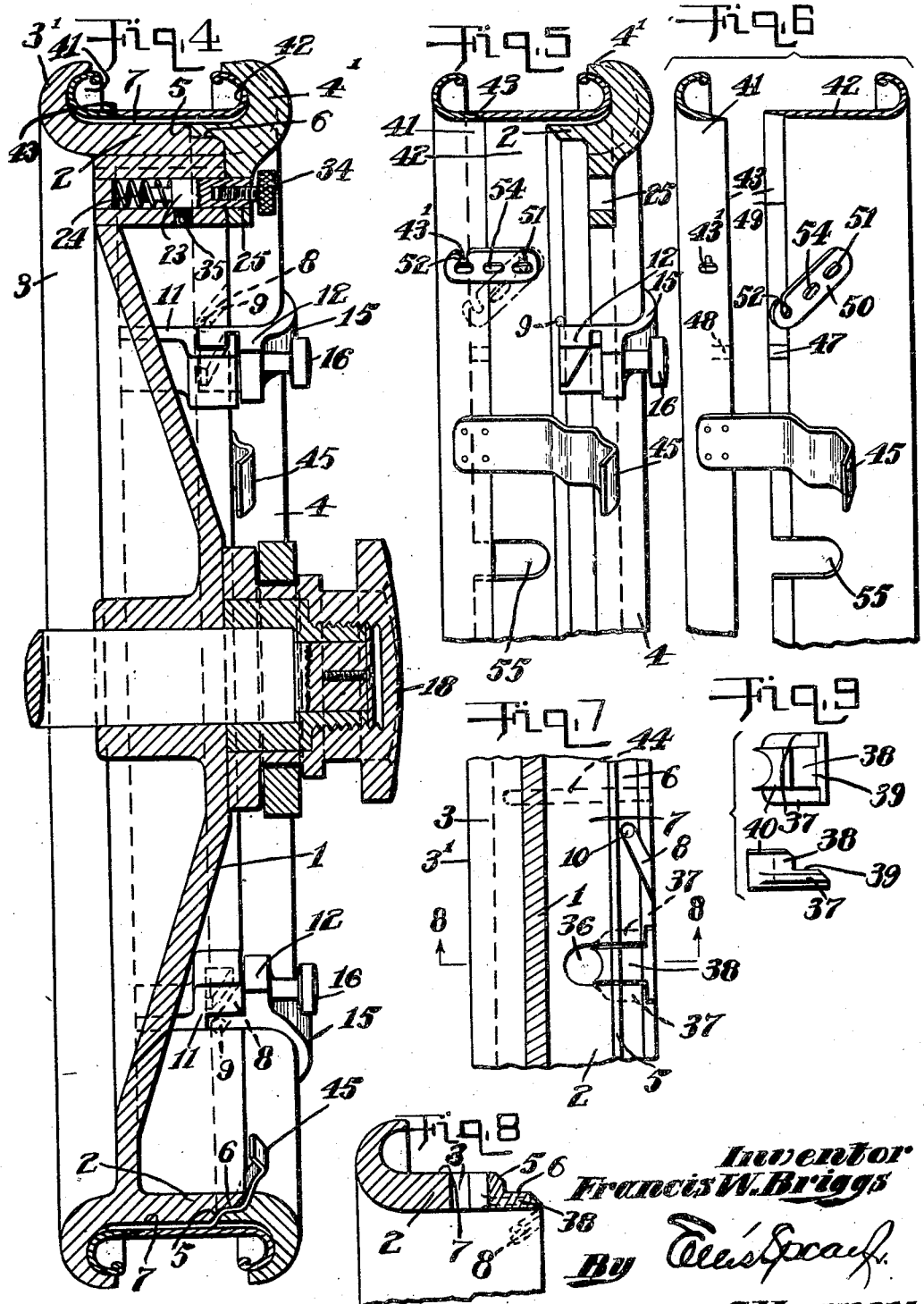

Patented Oct. 2, 1928.

1,686,068

UNITED STATES PATENT OFFICE.

FRANCIS W. BRIGGS, OF MEDFORD, MASSACHUSETTS.

RIM-REMOVING DEVICE.

Application filed May 18, 1925. Serial No. 30,945.

This invention relates to rim removing devices, of the general type disclosed in my prior application which resulted in grant of Letters Patent No. 1,530,031, dated March 17, 1925. The device of the present invention involves certain improvements upon and refinements over the device shown in said patent, particularly as to the method of and means for connecting and disconnecting the removable section of the rim from the peripheral wheel flange of the wheel. My present application also involves a novel method and means for connecting and disconnecting a spare rim from the wheel flange and an improved construction of spare rim designed to permit the free circulation of air between it and the wheel flange and thus prevent rusting of the spare rim on said flange. These, and various other features of novelty and utility which will appear more fully hereinafter, are secured in the device of the present invention. The construction and operation of my invention is fully described and illustrated in the accompanying specification and drawings, and the characteristic features of novelty particularly pointed out in the appended claims. In the drawings:—

Fig. 1 is a front view of a wheel and rim removing tool in accordance with my present invention.

Fig. 2 is an edge view thereof, the tire being shown in section.

Fig. 3 is a disassembled detail view particularly showing the peripheral wheel flange, spare rim, and removable rim section.

Fig. 4 is a section on the line 4—4 of Fig. 1.

Fig. 5 is a fragmentary section showing the spare rim and removable rim section locked together.

Fig. 6 is a similar view showing the two-part interlocking spare rim disassembled.

Fig. 7 is a fragmentary detail of the peripheral wheel flange, particularly showing the locking piece for the valve stem of the tire.

Fig. 8 is a section on the line 8—8 of Fig. 7.

Fig. 9 is a detail view of the removable locking piece for the valve stem.

Figs. 10, 11 and 12 are detail views of one of the locking plungers of the wrench for releasing the detent.

Fig. 10 shows the plunger locked.

Fig. 11 shows the plunger unlocked, and

Fig. 12 is a section on the line 12—12 of Fig. 11.

Figs. 13 and 14 are detail views of one of the locking lugs of the removable rim section, and Figs. 15 and 16 are detail views of one of the cooperating locking lugs on the peripheral wheel flange.

For the purpose of this application I have shown my invention applied to an automobile wheel of the disc type. This showing, however, is purely illustrative, and in no way limiting, since the invention may be applied with equal success to other types of wheels.

I have, therefore, indicated generally by the numeral 1 a wheel of the disc type which includes the usual peripheral wheel flange 2 for supporting a circumferentially divided two-part rim consisting of an inner section 3 which is permanently secured to the wheel flange 2 and an outer rim section 4 which is adapted to be removably connected to said wheel flange 2. Both rim sections 3 and 4 are provided with the usual flanges 3' and 4' for engaging the beaded edges of the tire T.

As here shown, the peripheral face of the wheel flange 2 is provided with an annular shoulder 5 (see Fig. 3) constituting an abutment for limiting the movement of the removable rim section 4 in its seating direction. Said face, therefore, includes an outer narrow peripheral portion 6 constituting a seat for the removable rim section, and an intermediate and relatively wider peripheral portion 7 beyond the shoulder 5 and constituting a seat for the tire and for an extra rim if a spare rim is employed, said portion 7 being circumferentially flanged, as indicated at 3', and said flange constituting an abutment cooperating with the circumferential flange 4' of the removable rim section to hold the tire or the spare rim in place.

In accordance with my general concept, the removable rim section 4 is adapted to be engaged with and disengaged from the wheel flange 2 by a slight rotary motion in either a clockwise or a counter-clockwise direction, according to whether the rim section is to be applied or removed, followed by a withdrawing motion in an axial direction.

The removable rim section 4 may be detachably locked to the wheel supporting flange 2 in any suitable manner. As here shown, the annular rim seat portion 7 of the wheel flange 2 is provided with a plurality of spaced inclined slots 8, and the removable rim section 4 is provided with an equal number of guide studs 9 which perform the double function of guiding and centering the removable rim section 4 as it is applied to the wheel flange 2 and of locking said section on the wheel flange when fully applied, the inner ends of said slots terminating in locking depressions 10 within which the studs lodge when the rim section 4 is fully driven home.

The wheel flange 2 and removable rim section 4 are each provided with a radially disposed series of male and female locking lugs 11 and 12, respectively, which are adapted to interengage with each other and detachably hold the parts together. As here shown, the female lugs 11 are carried by the wheel flange 2, and project outwardly from beneath the rim seat portion 6 of said flange intermediate of the slots 10. The female lugs 11 are detailed in Figs. 15 and 16. Each lug 11 is shaped to provide a cam face 13 adapted to be interengaged by a correspondingly inclined cam face 14 (Figs. 13 and 14) on the cooperating male lug 12 of the removable rim section 4. The male lugs 12 are provided with curved attaching portions 15 by means of which the lugs are fixed as by welding to the rim section 4 and with rounded heads 16 inset from the plane of the rim and adapted to be engaged by my improved wrench detailed in Figs. 1 and 2.

This wrench comprises an annular wrench portion 17 adapted to fit over the usual hub cap 18 of the wheel and provided with a pair of radial arms 19 terminating in handles 20 by means of which the wrench may be manipulated. Each arm between its ends is provided with a central opening 21 of a size adapted to readily slip over the heads 16 of the male lugs 12 on the removable rim section 4 and on either side with lateral recesses 22 adapted to fit beneath the heads 16 upon slight rotation of the wrench in one direction or the other.

In order to prevent the removable rim section 4 form accidentally separating from the wheel while the wheel is running on the road, I chamber the supporting flange 2 of the wheel, as shown in Fig. 4, to receive a pair of oppositely disposed locking detents 23 which are normally projected outwardly by coil springs 24 so as to engage and fit within a pair of locking openings 25 formed in the removable rim section. The engagement of the detents 23 in the locking openings 25 of the removable rim section 4 is a releasable engagement, however, and according to my invention is released by means of a pair of plungers 26 carried by a pair of radially disposed arms 27 on the wrench 18. Each plunger consists of a stem 28 (Figs. 10, 11 and 12) and a head 29 by means of which the plunger may be pressed inwardly through the bearing 30 formed for it in the arm 27, against the action of coil spring 31 confined within said bearing between said arm and said head. Each bearing 30 is provided with a bayonet slot 32 and the head of each plunger is provided with a locking pin 33 guiding in said slot. When, therefore, the plungers are fully pushed in, they may be given a slight turn to the right so as to carry said pins 33 into the closed ends of the bayonet slots 32 and lock the plungers in this position.

If desired, the detents 23 of the wheel flange may be provided with axial bores within which are threaded thumb screws 34 (Fig. 4) which act as dust guards. These thumb screws are, of course, removed before the wrench 18 is applied to the rim section 4 for the purpose of unlocking the detents and withdrawing the rim from the wheel flange.

In order to prevent unauthorized removal of the rim section 4 and thus of the tire, I preferably tap and thread a hole through the bearing for one or both of the detents 23 at right angles to said detent and mount in said hole a locking screw 35 (Fig. 4), the head of which is formed to be engaged by a key of special shape carried by the car owner.

The portions 6 and 7 of the wheel flange 2 are intersected by an inwardly extending slot 36 (Figs. 3 and 7) to receive the valve stem V of the tire, and the walls of this slot are provided with key-ways within which fit a pair of longitudinally extending keys 37 on the sides of an axially sliding locking piece 38. (See Fig. 9.) This locking piece is rounded at its inner end, as shown in Fig. 9, and the inner end of the slot 36 is rounded so as to provide with the rounded end of the locking piece a cylindrical hole within which the valve stem lies. The inner face of the locking piece is gouged out to leave a transversely extending shoulder 39 across the outer end of the locking piece by means of which the locking piece may be engaged and withdrawn from the slot so as to permit the removal of the tire valve endwise through the slot when the tire is taken off, and the inner end of the locking piece is offset, as indicated at 40, to lie in the plane of the peripheral portion 7 of the wheel flange 2.

The operation thus far is as follows:—
With the rim section 4 applied as shown in Fig. 1 and assuming that it is desired to remove said rim section from the wheel flange, the locking screw 35 is first unlocked by means of the proper key and the thumb screws 34 are removed from the detents 23.

The wrench 18 is then applied to the hub cap with the heads 16 of the male lugs 12 entered through the enlarged recesses 21 of the wrench arms 19 and lodged in one of the lateral recesses 22 at either side of the central recesses. The plungers 26 of the wrench are thus aligned with the locking detents 23 of the wheel flange so that when the plungers are pushed inwardly the full distance of their movement and turned slightly to the right, the locking pins 33 thereof lodge in the closed ends of the bayonet slots 32.

In this position, the locking detents 23 of the wheel flange are pushed backwardly far enough to disengage from the locking openings 25 of the removable rim section 4 and said section 4 may now be removed by simply turning it through a slight revolution counter-clockwise so as to disengage the interlocking lugs 11 and 12, whereupon the rim section 4, with the wrench attached thereto, may be withdrawn axially from the wheel.

After the tire has been changed, the removable rim section 4 is reapplied to the wheel by simply reversing the operation; that is to say, the wrench is again slipped over the hub cap with the guiding studs 9 thereof lodged within the inclined slots 8 of the wheel flange, so as to bring the male lugs 12 of the rim section 4 in position to interlock with the female lugs 11 of the wheel flange 2 when the wrench is turned to the right in Fig. 1. The locking plungers 26 are first released, however, by turning their heads 29 to the left a distance sufficient to disengage the locking pins 33 from the closed ends of the bayonet slots 32 and permit the coil springs 31 to project said plungers outwardly, after which the recesses 22 of the wrench arms 19 are again engaged with the heads 16 of the male lugs 12 of the removable rim section 4, and the wrench is turned through a slight part of a revolution clockwise to carry said lugs 12 fully under the female lugs 11 of the wheel flange. The locking detents 23 of the wheel flange now re-enter the locking openings 25 of the removable rim section 4, and the rim is now re-locked on the wheel. The wrench is, therefore, disengaged from the rim section 4 by simply withdrawing the slotted arms 19 thereof from beneath the heads 16 of the male lugs 12.

The spare rim is a circumferentially divided rim consisting of a relatively narrow inner section 41 and a relatively wide outer section 42, the meeting edges of which are beveled to a knife edge, as indicated at 43 (Fig. 6) to enable said sections to fit tightly upon each other. The inner section 41 carries a plurality of spaced pins 43' which are adapted to be received in a series of grooves 44 (Fig. 3) in the wide portion 7 of the wheel flange 2 and is also provided with a plurality of spring tongues 45 which are received in aligned grooves 46 cut in the peripheral portions 6 and 7 of the wheel flange 2. These tongues all lie flush with the peripheral faces of said portions 6 and 7 and at their outer ends are bent inwardly so as to constitute engaging projections by means of which the rim section 41 may be withdrawn from the wheel flange.

The outer section 42 of the spare rim fits over the inner rim section 41 with an overlapping fit, the beveled edges 43 of said sections being provided with a plurality of interengaging guiding tongues 47 and slots 48 adapted to center and guide the sections onto each other in assembling the rim, and the section 42 being provided with an annular shoulder 49 to limit the movement of said section onto the section 41.

The rim sections are locked together by means of a series of latches 50 which are pivoted to the outer rim section 42 at 51 and are provided with hook ends 52 which engage over the pins 43' on the inner rim section. Between their ends, the latches themselves carry inwardly projecting studs 54 which guide in the same grooves 44 of the wheel flange which receive the pins 43' of the inner rim section.

The studs 54 are of a height sufficient to slightly space the rim section from the peripheral face of the wheel flange, and this space permits a circulation of air between the spare rim and the wheel flange, and assists to prevent rusting or freezing of the spare rim on the flange.

The outer rim section 42 is provided at its inner edge with a notch 55 which fits over the valve stem of the tire.

With this type of rim, it is possible to remove the inner tube from the shoe without removing the shoe entirely from the rim. The spare rim with the tire thereon is first removed from the wheel. The rim is then laid with its outer rim section 42 face down on the ground and the rim sections are separated by disengaging the latches 50. The inner tube may then be drawn out of the shoe without removing the shoe itself from the outer rim section 42.

With the spare rim applied to the wheel flange 2 in the position shown in Fig. 4, the removable rim section 4 is next applied in the manner already described to clamp the spare rim on the wheel flange. In removing the spare rim from the wheel flange, the removable rim section 4 is first taken off in the manner already described. Should the inner rim section 41 of the spare rim be rusted or frozen on the wheel flange, or should this section of the spare rim be used as a spacer between the tire shoe and the wheel flange as is sometimes the case, it may be withdrawn from the wheel flange by means of a double wrench of the type shown in my said Patent No. 1,530,031, equipped with withdrawing lugs adapted to engage the tongues 45 of said rim section 41.

Various other modifications in the construction and operation of my device may obviously be resorted to or without departing from the spirit of my invention, if within the limits of the appended claims.

What I therefore claim and desire to secure by Letters Patent is:

1. In combination with a wheel structure having a spaced series of locking lugs, a removable rim part having a correspondingly spaced series of lugs engageable with and disengageable from said first named lug series upon rotation of the rim part relative to the wheel structure, said lug series of the removable rim part being headed to receive a wrench for rotating said rim part on and off said wheel structure.

2. In combination with a wheel structure having a projectable locking detent, a removable rim part interlocked with said detent by a rotary motion, and a manually operable lock for releasably holding said detent projected, and comprising a key operated member rotatable into engagement with said detent about an axis transverse to the line of projection of said detent.

In testimony whereof I affix my signature.

FRANCIS W. BRIGGS.